United States Patent
Balusani et al.

(10) Patent No.: US 11,488,078 B2
(45) Date of Patent: Nov. 1, 2022

(54) SYSTEM AND METHOD FOR TIME SLOT ASSIGNMENT

(71) Applicant: ShiftX LLC, Chandler, AZ (US)

(72) Inventors: Srikanth Balusani, Chandler, AZ (US); Bhargavi Balusani, Chandler, AZ (US); Hari Manivannan, Chandler, AZ (US); Suchita Sharma, Gilbert, AZ (US); Guy Bieber, Gilbert, AZ (US)

(73) Assignee: SHIFTX LLC, Chandler, AZ (US)

( * ) Notice: Subject to any disclaimer, the term of this patent is extended or adjusted under 35 U.S.C. 154(b) by 225 days.

(21) Appl. No.: 16/712,850

(22) Filed: Dec. 12, 2019

(65) Prior Publication Data

US 2020/0327478 A1   Oct. 15, 2020

Related U.S. Application Data

(60) Provisional application No. 62/833,542, filed on Apr. 12, 2019.

(51) Int. Cl.
  *G06Q 10/06* (2012.01)
  *G06Q 30/08* (2012.01)

(52) U.S. Cl.
  CPC ........... *G06Q 10/063112* (2013.01); *G06Q 10/063116* (2013.01); *G06Q 30/08* (2013.01)

(58) Field of Classification Search
  CPC .............. G06Q 10/063112; G06Q 10/063116
  See application file for complete search history.

(56) References Cited

U.S. PATENT DOCUMENTS

| | | | |
|---|---|---|---|
| 8,612,272 B1* | 12/2013 | Aykin | G06Q 10/0631 705/7.22 |
| 2004/0078256 A1* | 4/2004 | Glitho | G06Q 10/109 709/207 |
| 2010/0257015 A1* | 10/2010 | Molander | G06Q 10/06 707/E17.014 |
| 2012/0060166 A1* | 3/2012 | Jardine | G06Q 10/109 718/104 |
| 2015/0006222 A1* | 1/2015 | Isherwood | G06Q 10/1097 705/7.21 |
| 2018/0174085 A1* | 6/2018 | McCoy | G06Q 30/016 |
| 2019/0228381 A1* | 7/2019 | Grinolds | H04L 12/1818 |
| 2019/0334907 A1* | 10/2019 | Rodden | H04L 63/0861 |
| 2020/0210902 A1* | 7/2020 | VonAllmen | G06Q 10/02 |
| 2020/0210965 A1* | 7/2020 | Garber | G06N 5/04 |
| 2020/0234380 A1* | 7/2020 | Dulori | G06Q 40/08 |
| 2020/0302348 A1* | 9/2020 | Rawle | G06Q 10/063 |

OTHER PUBLICATIONS

Melanie L. De Grano et al, Accommodating individual preferences in nurse scheduling via auctions and optimization, Health Care Manage Sci (2009) 12:228-242 (Year: 2008).*

* cited by examiner

*Primary Examiner* — Andre D Boyce
(74) *Attorney, Agent, or Firm* — Alleman Hall Creasman & Tuttle LLP

(57) ABSTRACT

A time slot scheduling system is provided. Employees are divided into bid groups and a bidding session is created for a group of time slots in which preference time windows are specified for each employee in the bid group(s) of the bid to input their time slot preferences, and a bidding time window is specified for each employee in the bid group(s) of the bid to select their time slots among the vacant time slots in the bidding session.

17 Claims, 17 Drawing Sheets

BID GROUPS 204

| NAME | STATION | DESCRIPTION | JOB TYPE | CONTRACT GROUP | CLASSIFICATION |
|---|---|---|---|---|---|
| GROUP 1 | A | Associate | FT | — | ABC |
| GROUP 2 | A | Manager | FT | — | DEF |
| GROUP 3 | B | Associate | FT | — | ABC |
| GROUP 4 | B | Assistant | PT | — | DEF |

FIG. 2A

WORKERS IN BID GROUPS ~204

| GROUP 1 | GROUP 2 | GROUP 3 | GROUP 4 |
|---|---|---|---|
| John B. | Robert B. | William B. | Richard B. |
| Jennifer C. | Patricia C. | Barbara C. | Susan C. |
| Christopher D. | Michael D. | David D. | Charles D. |
| Mary E. | Linda E. | Elizabeth E. | Margaret E. |

FIG. 2B

BUDDY REQUEST

Select an employee to send a request

Smith, John (123456) — 76

Employee ID   Last Name   First Name
123456        Smith       John

Select Bid Detail

☐ Allow to View Preferences — 78
☐ Allow to Bid for Me — 80
☐ Allow to Bid Together — 82

204

SEND REQUEST — 84

FIG. 7

PREFERENCE #1

I want one of these weeks
I want this week
I want consecutive weeks

— 120

Week #1
Week #2
Week #3
Week #4
Week #5
Week #6
Week #7
Week #8
Week #9
Week #10
Week #11
Week #12
Week #13
Week #14
Week #15
Week #16

PREFERENCE #1

I want to replace Awarded or Open week

- Open Vacation Week #1
- Open Vacation Week #2
- Open Vacation Week #3
- Open Vacation Week #4
- Open Vacation Week #5

120 with

Week #1 | Week #2 | Week #3 | Week #4 | Week #5 | Week #6 | Week #7 | Week #8 | Week #9 | Week #10 | Week #11 | Week #12 | Week #13 | Week #14 | Week #15 | Week #16

SYSTEM AND METHOD FOR TIME SLOT ASSIGNMENT

BACKGROUND

Large employers utilize computerized scheduling systems which assign employees to different time slots, which may include work shifts or vacation days and weeks. In many businesses, an employee's work schedule varies from day to day and week to week. Certain employees may be part-time, while others may be full-time. The locations in which the employees work may vary greatly. Employers often find it hard to balance the preferred vacation days, work schedules, and work locations of employees with the staffing requirements of the employers when assigning work shifts and vacation time to each employee.

SUMMARY

To address these issues, a time slot scheduling system is provided for assigning time slots. According to a first aspect of the present disclosure, the system comprises a processor; a time slot database storing a plurality of time slots, and a memory storing instructions that, when executed by the processor, cause the system to perform a method. The method comprises receiving preferences of a first user from a first client device during a first preference selection session; sorting the plurality of time slots based on the preferences of the first user and compiling a first list of time slots; sending the first list of time slots to the first client device; receiving preferences of a second user from a second client device during a second preference selection session; sorting the plurality of time slots based on the preferences of the second user and compile a second list of time slots; sending the second list of time slots to the second client device; receiving a first user selection of a time slot from the first user during a bidding session; receiving a second user selection of a time slot from the second user during the bidding session; when the first user selection overlaps with the second user selection, assigning time slots to the first user and second user based on predetermined priority rules; and when the first user selection does not overlap with the second user selection, assigning the time slot selected by the first user to the first user, and assigning the time slot selected by the second user to the second user. The time slots may be work shifts or vacation periods.

According to another aspect of the present disclosure, a method is provided for reassigning vacation periods between a first employee requesting to replace a first old vacation period with a first new vacation period, and a second employee requesting to replace a second old vacation period with a second new vacation period. The method comprises selecting the first new vacation period in an allotments pool; scanning preferences of each employee for preferences corresponding to the selected vacation period based on predetermined priority rules; when preferences corresponding to the selected vacation period is found in the first employee, assigning the selected vacation period to the first employee as the first new vacation period, decreasing an allotment number of the first new vacation period, releasing the first old vacation period into the allotments pool, and decreasing an allotment number of the first old vacation period; selecting the first old vacation period in the allotments pool as the second new vacation period; scanning preferences of each employee other than the first employee for preferences corresponding to the selected vacation period based on the predetermined priority rules; and when preferences corresponding to the selected vacation period is found in the second employee, assigning the selected vacation period to the second employee as the second new vacation period, decreasing an allotment number of the second new vacation period, releasing the second old vacation period into the allotments pool, and decreasing an allotment number of the second old vacation period.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A shows an illustration of bid groups in a scheduling program according to an embodiment of the present disclosure. FIG. 2B shows an illustration of how employees may be grouped according to the bid groups of FIG. 2A.

FIG. 7 shows an illustration of a buddy request that may be inputted by the user in the scheduling program according to an embodiment of the present disclosure.

FIG. 8 shows an illustration of preferences that a user may input in a preference time window of a vacation scheduling program for annual bidding according to an embodiment of the present disclosure.

FIG. 9 shows an illustration of an example user interface that the user interacts with during the preference time window of the vacation scheduling program according to an embodiment of the present disclosure.

FIG. 13 shows an illustration of preferences that a user may input in a preference time window of a vacation scheduling program for change period bidding according to an embodiment of the present disclosure.

DETAILED DESCRIPTION

Example aspects of the present disclosure are described herein in the context of systems, methods and computer program products for providing a time slot scheduling system. the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Figure 1:
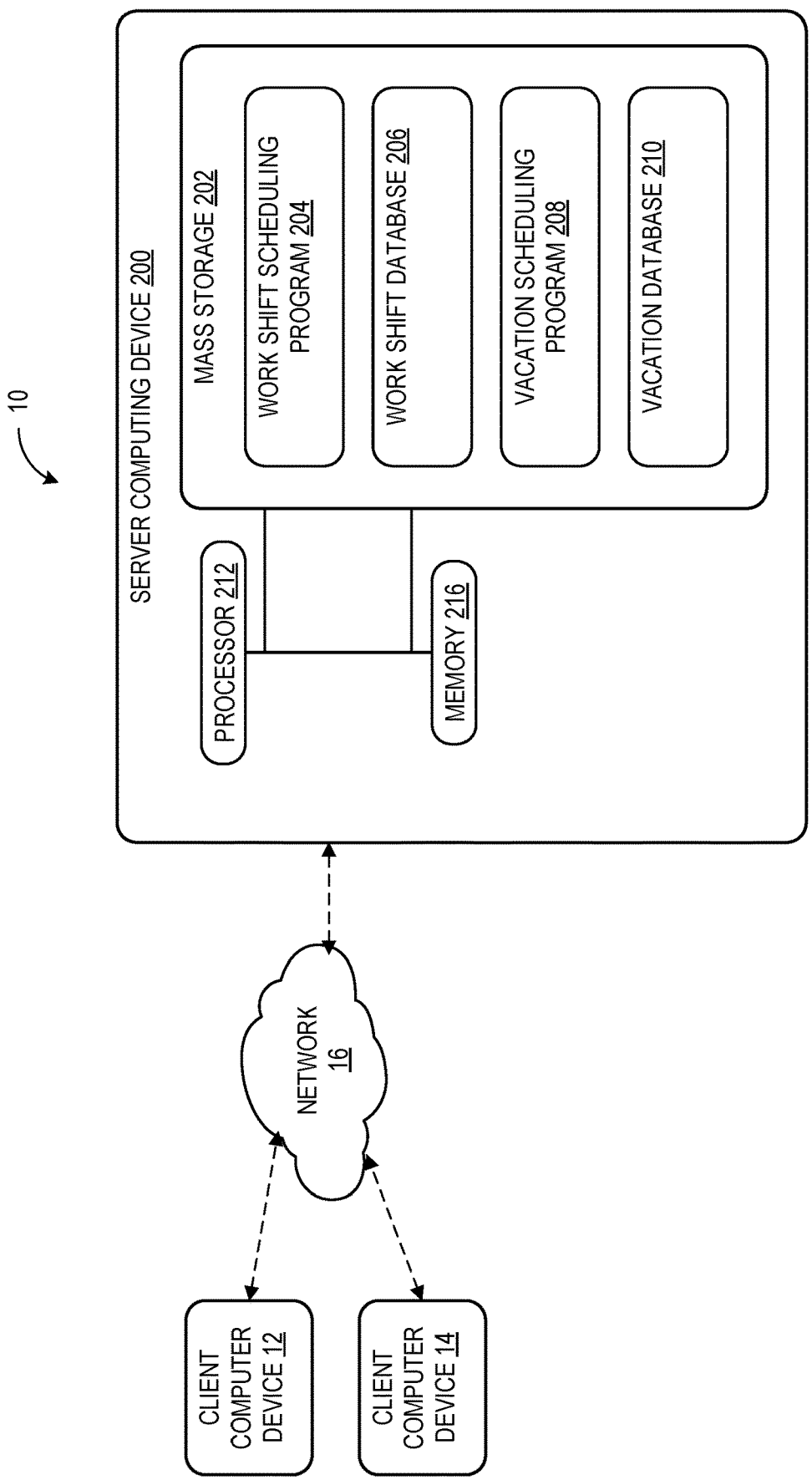
FIG. 1 shows an illustration of a scheduling system according to an embodiment of the present disclosure.

According to one aspect, FIG. 1 depicts one example configuration of a scheduling system 10 for assigning a work shift to an employee and/or assigning vacation time to an employee. In one aspect, system 10 may be implemented as a software application, a desktop widget, an applet, a script or other type of software program code executable on a computing device 200, such as a server, networking computer, mobile communication device, desktop computer, laptop computer, tablet computer, or any other type of suitable computing device. As shown, the system 10 may have a work shift scheduling program 204 and work shift database 206 that may be stored in mass storage 202 of the server computing device 200. The work shift scheduling program 204 may be loaded into memory 216 and executed by a processor 212 of the server computing device 200 to perform one or more methods and processes for scheduling work shifts. At least a client computer device 12 and a client computer device 14 communicate with the server computing device 200 through a physical connection or through a wireless connection, such as via a network 16. Any suitable network connections may be used.

Additionally, or alternatively, the system 10 may have a vacation scheduling program 208 and vacation database 210 that may be stored in mass storage 202 of the server computing device 200. The vacation scheduling program 208 may be loaded into memory 216 and executed by a processor 212 of the server computing device 200 to perform one or more methods and processes for scheduling vacation periods.

According to an aspect of the present disclosure, an administrator may group the employees into bid groups. As illustrated in FIGS. 2A and 2B, a bid group of the shift scheduling program 204 or vacation scheduling program 208 may include employees of the same station, job title, contract group, or classification, for example. When using the shift scheduling program 204, the administrator selects one or more vacant work shifts (see FIG. 4 for example) that the administrator desires to fill, and then using the shift scheduling program 204, schedules one or multiple bidding sessions (bidding sessions will hereinafter be interchangeably referred to as live bidding time windows) in which employees of one or more bid groups are invited to participate to fill the one or more vacant work shifts in the work shift group. The invited employees in the bid groups are determined to be available for the selected work shifts and qualified to fill the selected work shifts. When scheduling a given bidding session, the administrator selects one or more bid groups to participate in the given bidding session.

Alternatively, instead of an administrator selecting one or more vacant work shifts, an open time automation application may identify open work shifts and available employees to minimize the number of schedule weeks created and irregular schedules. These open work shifts may be work shifts that are not currently assigned due to employees having a sick day, single day off, or surge in capacity, for example.

When using the vacation scheduling program 208, the administrator selects one or more vacant vacation weeks (see FIG. 9 for example) that need to be filled, and then using the vacation scheduling program 208, schedules one or multiple bidding sessions in which employees of one or more bid groups are invited to participate to fill the one or more vacant vacation weeks in the one or more bid groups. For each employee, the administrator may select a predetermined number of weeks out of each year to meet the vacation liability of the employee and fulfill staffing needs. It will be appreciated that a vacation week may be defined as a vacation period with a predetermined duration that may be shorter or longer than a calendar week. The invited employees in the bid groups are determined to be qualified to accept the vacant vacation weeks and not exceed a vacation quota for vacation time taken during a predetermined time period, for example. When scheduling a given bidding session, the administrator selects one or more bid groups to participate in the given bidding session.

A bidding session or live bidding time window is a scheduled online event in which multiple invited employees bid to accept vacant work shifts or vacant vacation weeks (hereinafter, vacant time slots) that the invited employees are eligible for. During bidding, the invited employees indicate the vacant time slots that they choose or claim for themselves. A bidding session comprises a limited duration of time during which the invited employees are permitted to bid for the vacant time slots. The same live bidding time window may be scheduled for all employees, multiple live bidding time windows may be scheduled for multiple employees, or each employee may be scheduled a live bidding time window that does not overlap with the other live bidding time windows. When each employee is scheduled a live bidding time window, the live bidding time windows may be scheduled by seniority rules or priority rules, so that more senior employees are assigned earlier live bidding time windows, and more junior employees are assigned later live bidding time windows. Seniority rules or priority rules may be based on hire date, job title, pay grade, seniority rank, union seniority, and/or work performance, for example. It will be appreciated that if bid windows are provided on a per-user basis such as this, then each bid window will be populated only with time slots that have not been assigned to other users, and therefore the possibility that two users select the same time slot is avoided. While avoiding overlapping time slot selections, per-user bid windows do have the downside in some deployments that they take more time to complete than assigning multiple users to each bid window. In such situations, multi-user bid windows may be preferable, as they perform time slot assignments in batches and thus generally take less time to complete.

Figure 3:
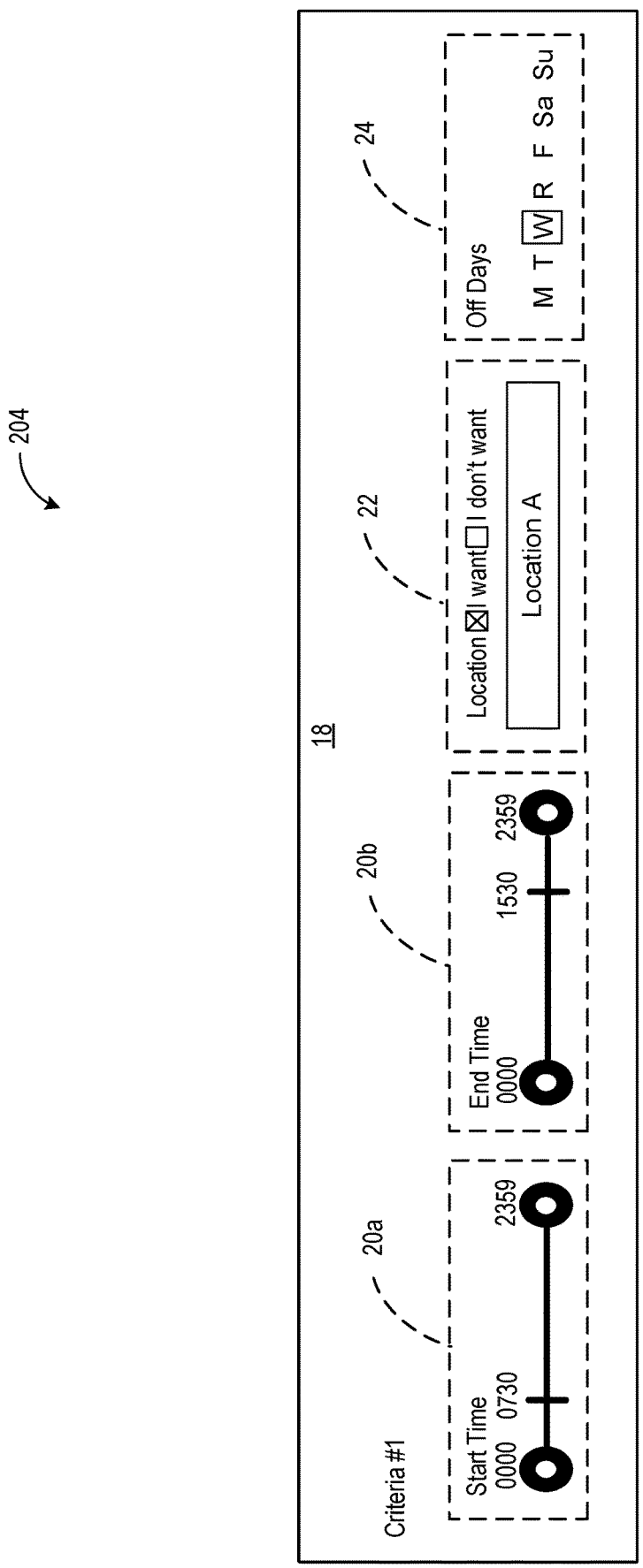
FIG. 3 shows an illustration of preferences that a user may input in a preference time window of a shift scheduling program according to an embodiment of the present disclosure.

FIG. 3 illustrates an example of employee preferences that may be input by the employee during a preference selection session (hereinafter interchangeably referred to as a preference time window) that is scheduled before the shift bidding session in a shift scheduling program 204. The employee preferences may include preferable and non-preferable work shifts, work shift start times, work shift end times, work locations, and off days. These preference criteria may be input during the preference selection session, or may be input anytime at the convenience of the employee before or during the live shift bidding session. In this example, the preference user interface 18 is displayed by the shift scheduling program 204.

A start time graphical user interface (GUI) control 20a and an end time GUI control 20a are displayed on the user interface 18. In this implementation, each GUI control 20a and 20b is displayed as a slider control by the shift scheduling program 204. The start time GUI control 20a is manipulated by the employee to set a preferred start time, while the end time GUI control 20b is manipulated by the employee to set a preferred end time of the work shift. In this example, the employee has indicated a time of 7:30 am as the preferred start time, and a time of 3:30 pm as the preferred end time. A location GUI control 22 is displayed for the employee to specify work locations where the employee would prefer to work, or specify work locations where the employee would not prefer to work. An off day GUI control 24 is displayed for the employee to specify which days of the week the employee prefers as days off work.

Figure 4:
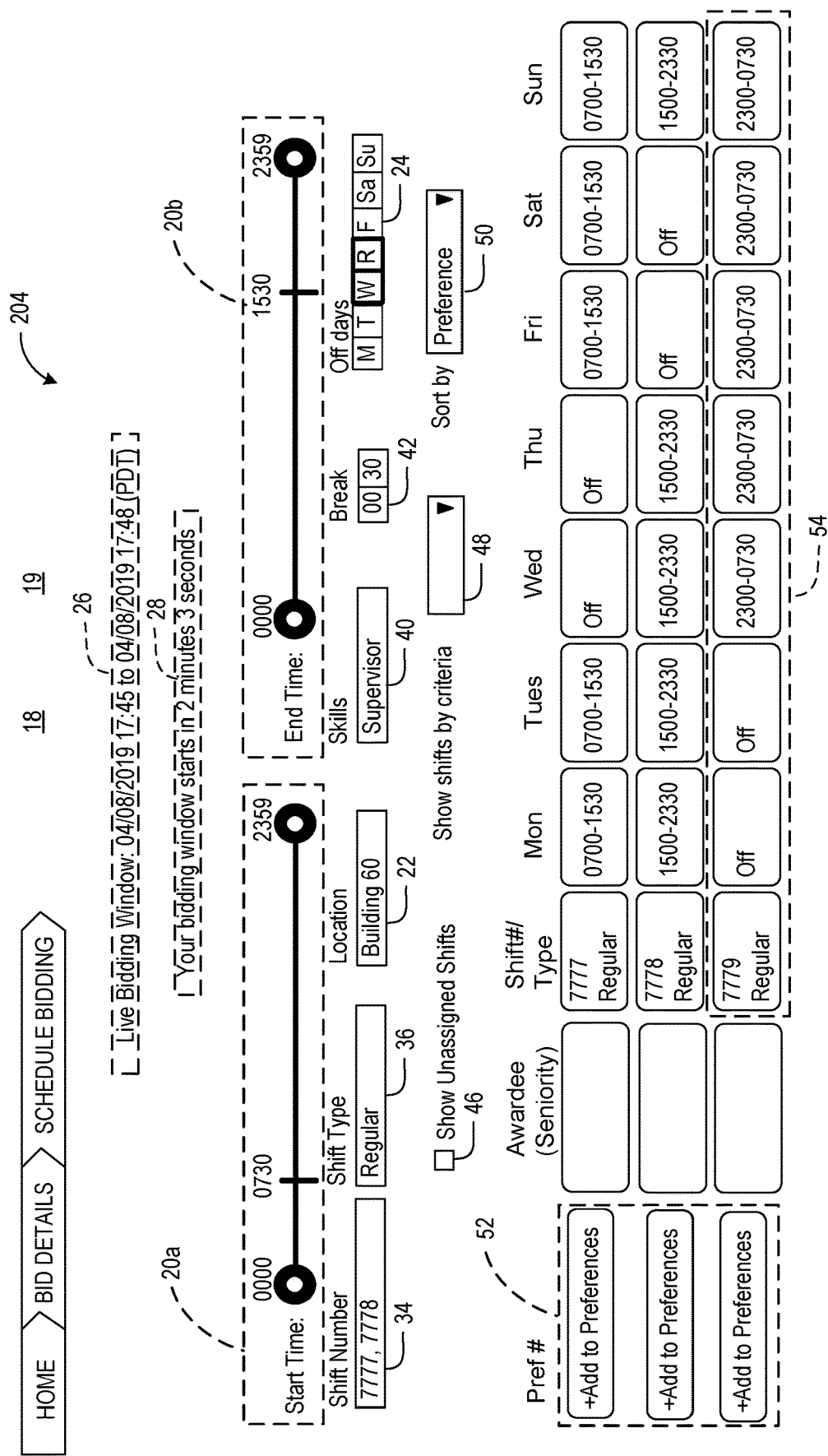
FIG. 4 shows an illustration of an example user interface that the user interacts with during the preference time window of the shift scheduling program according to an embodiment of the present disclosure.

FIG. 4 illustrates an example user interface 18 of a preference time window 19 of a preference selection session of the shift scheduling program 204. During the preference time window 19, the employees select specific work shifts that they prefer by pressing the 'add to preferences' button 52, and/or input their preferences for their work shifts by indicating preferred scheduled days off, start time, end time, work location, or a combination of these. Each employee may indicate their preferences against specific work shifts in order of preference (#1 choice, #2 choice, #3 choice), hereinafter referred to as a preference sequence. The number of preferences that each employee indicates in the preference sequence is not particularly limited. The start time and date and duration of the preference selection session are scheduled by an administrator or programmatically scheduled via an algorithm or predetermined rules.

In this example, the user interface 18 indicates a live bidding window duration 26 and the bidding window start time 28. The user interface 18 may also include a shift number box 34 to enter a preferred work shift number, a shift type box 36 to enter a preferred work shift type, a skills box 40 to select a preferred skill, a break time box 42 to select a preferred break time duration. The employee may check a box 46 to show unassigned work shifts, and select a criteria at the criteria box 48 to show work shifts by a selected criteria. Further, the employee may select a preference at the preference box 50 to sort the displayed work shifts by preferred criteria. The employee may add a displayed work shift 54 to the employee's preferences by selecting a preference button 52 corresponding to the preferred work shift 54.

An employee accepts an invitation to participate in a bidding session to fill one or more vacant work shifts, and the server starts the preference selection session at the scheduled time and date for the scheduled duration. The employee inputs one or more preference criteria for the kind of work shift that the employee would prefer to be assigned to. When an employee does not set any preference criteria at all before the live bidding time window begins, and does not participate in the live bidding time window of a given bidding session, the server may execute predetermined sort rules to auto-assign a vacant work shift to the employee, or the server may reschedule another bidding session or another preference selection session and bidding session for a later time. When an employee inputs preferences in the preference time window 19, but does not participate in the live bidding time window of a given bidding session, a processor may execute predetermined sort rules to auto-assign a vacant work shift based on the employee's preferred criteria inputted during the preference selection session. The same preference selection session may be scheduled for all employees, or multiple preference selection session may be scheduled for multiple employees.

Figure 5:
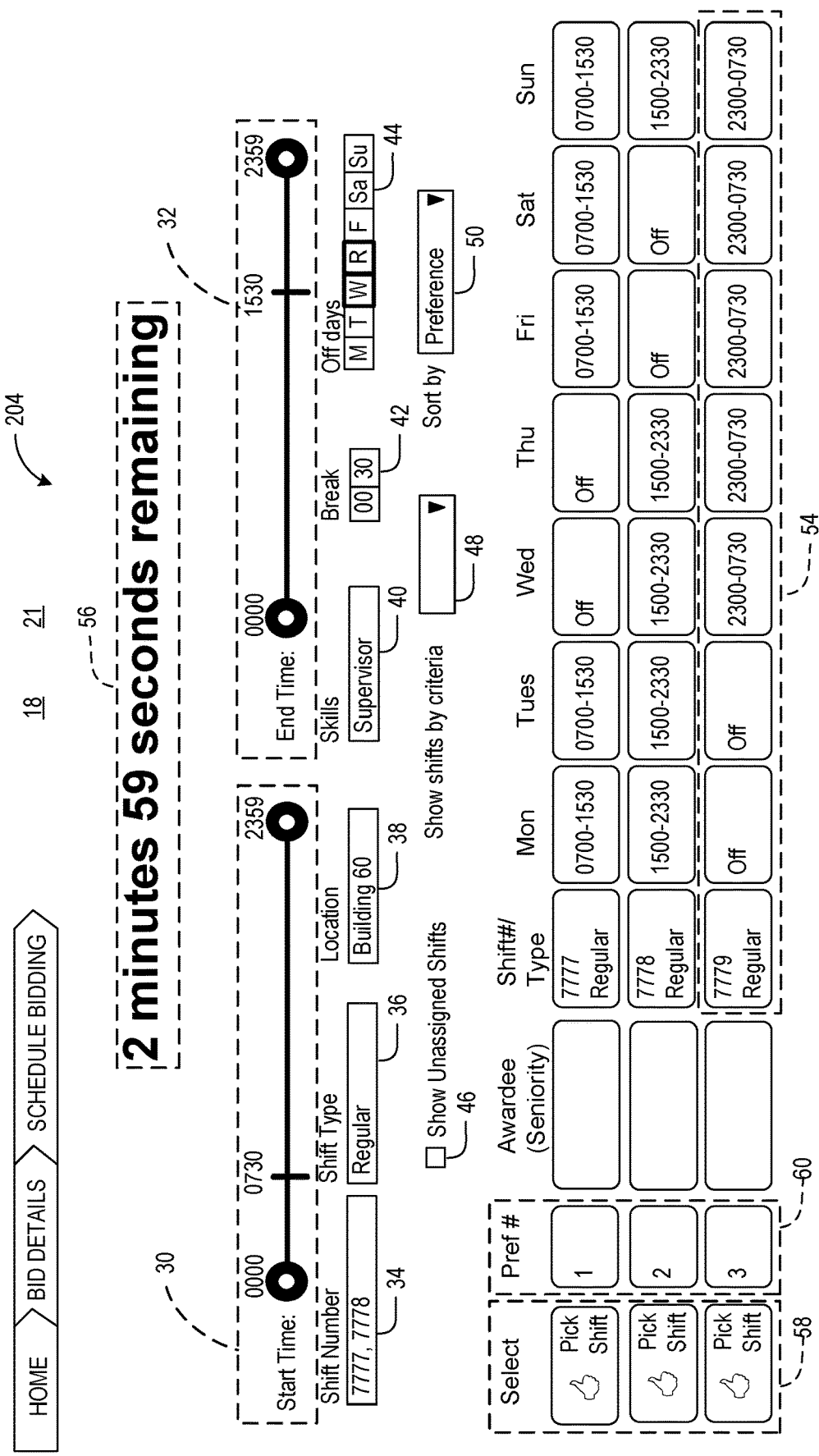
FIG. 5 shows an illustration of an example user interface that the user interacts with during the live bidding time window of the shift scheduling program according to an embodiment of the present disclosure.

FIG. 5 illustrates an example user interface 18 of a live bidding time window 21 of the shift scheduling program 204 for a shift bidding session. An employee participating in the shift bidding session logs into the live bidding time window 21, which is scheduled to take place after the preference time window. In other words, after the server terminates the preference time window, the server starts the live bidding time window 21 at the scheduled date and time for the scheduled duration. The live bidding time window 21 may be a controlled window that is active only for a predetermined time duration. Accordingly, the user interface 18 may include a live timer 56 showing the time left for bidding in real time. The employee may be notified or reminded of a scheduled bidding session by the shift scheduling program 204. The preferences selected in the preference time window may be indicated in the preferences column 60 to aid the employee in selecting work shifts during the shift bidding session.

During the live bidding time window 21, the user interface 18 may display live feeds of multiple available work shifts that closely match the preference criteria that the employee indicated during the preference selection session, prepopulating the user interface 18 with available work shifts based on the preferences of the employee. Accordingly, work shifts 54 on display may appear or disappear in real time as work shifts are assigned or released for reassignment. The user interface 18 may also display assigned work shifts of the coworkers of the employee participating in the bidding session. The employee may check a box 46 to filter the displayed work shifts to show only unassigned work shifts, select a criteria at the criteria box 48 to only show work shifts that match the selected criteria. Further, the employee may select a preference at the preference box 50 to sort the displayed work shifts by a selected preference.

In the illustrated example of FIG. 5, the employee logs into the live bidding time window 21 during the scheduled shift bidding session and bids for a desired work shift 54 by selecting the button 58 corresponding to the desired work shift 54. If the employee bids for a plurality of work shifts, multiple buttons 58 may be selected to select a plurality of work shifts. The employee may be assigned, by default, the work shift that the employee selects in the live bidding time window 21, if no other employee selects the same work shift (as occurs for example when the bid window is offered on a per-user basis, and is thus not offered to any other users). However, if the bid window is offered to multiple users and two or more employees select the same work shift, the server may sort the two or more employees selecting the same work shift by the predetermined sort rules or priority sort rules configured by the administrator, and one employee is assigned to the work shift, while the other employee who selected the same work shift is assigned a different, vacant work shift that most closely matches the preference criteria indicated by the employee.

Figure 6:
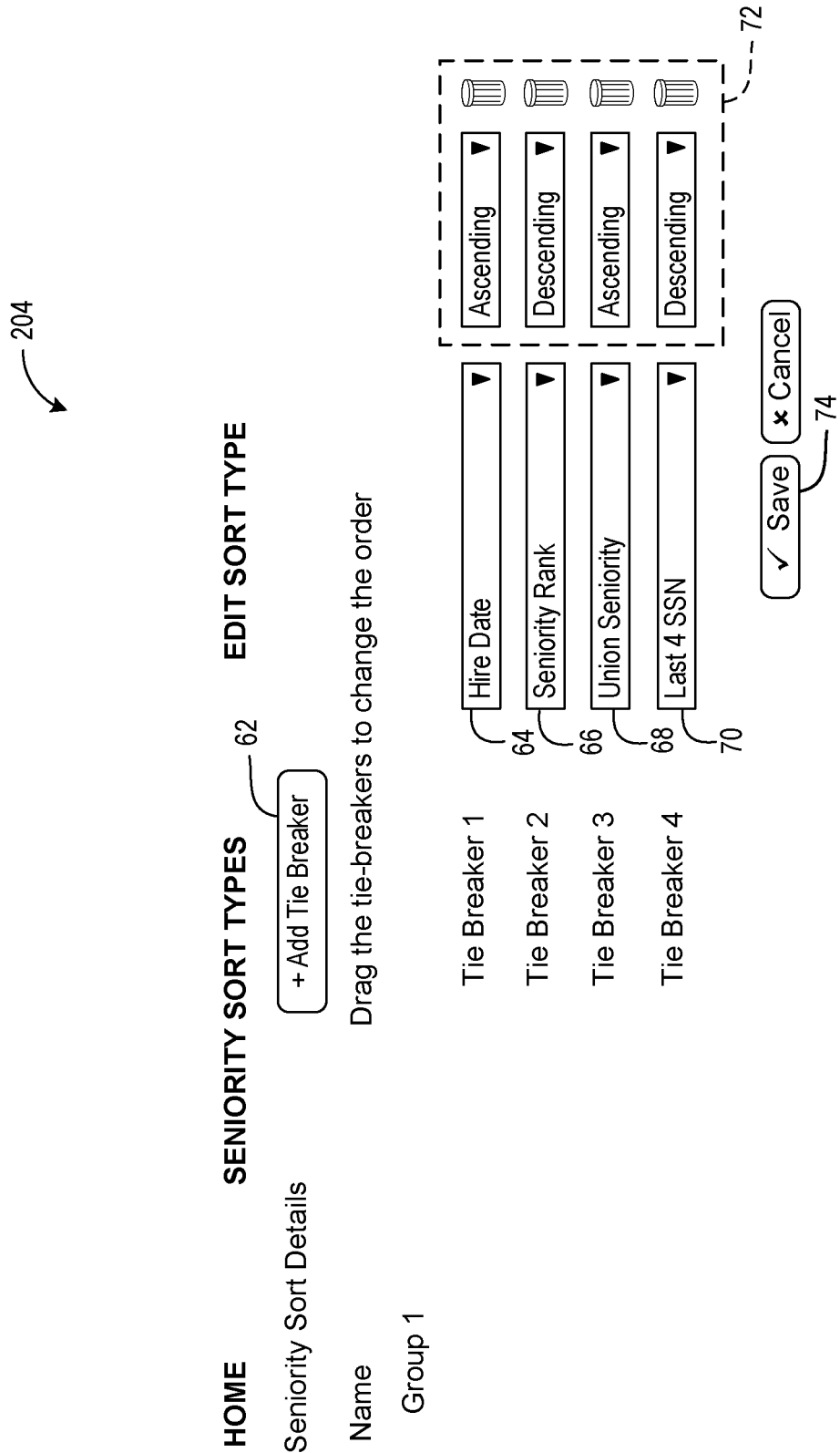
FIG. 6 shows an illustration of predetermined sort rules in the scheduling program according to an embodiment of the present disclosure.

FIG. 6 illustrates an example of predetermined sort rules, or tie breaker rules that the administrator may input to determine who is assigned a given time slot if two or more employees select the same time slot during the live bidding time window, or predetermined sort rules that the administrator may input to determine the priority rank of the order in which the live bidding time windows for each employee are scheduled. In this example, the administrator may select a button to add a tie breaker rule. The administrator may select a sort rules box 64 to sort employees by hire date, sort rules box 66 to sort employees by seniority rank, sort rules box 68 to sort employees by union seniority, and/or sort rules box 70 to sort employees by their last four digits of the employee's social security number, for example. Each sort rule can be qualified as ascending or descending by selecting the respective selection box 72. The tie breaker rules are saved by selecting the save button 74.

In this example where the predetermined sort rules are applied to determine a time slot assignment, when two or more employees select the same time slot, the employee with the earlier hire date may be assigned the time slot. If the two employees share the same hire date, then the employee with the higher seniority rank may be assigned the time slot. If the two employees share the same seniority rank, then the employee with the higher union seniority may be assigned the time slot. If the two employees share the same union seniority, then the employee with the largest last four digits of the employee's Social Security Number may be assigned the time slot. Accordingly, the predetermined sort rules provide tie breaker rules to determine which employee is prioritized to be assigned a selected time slot when the selected time slot is claimed by multiple employees.

In an example where the predetermined sort rules are applied to determine the order in which the live bidding time windows for each employee are scheduled, the employee with the earlier hire date may be assigned the earlier live bidding time window. If the two employees share the same hire date, then the employee with the higher seniority rank may be assigned the earlier live bidding time window. If the two employees share the same seniority rank, then the employee with the higher union seniority may be assigned the earlier live bidding time window. If the two employees share the same union seniority, then the employee with the largest last four digits of the employee's Social Security Number may be assigned the earlier live bidding time window. Accordingly, the predetermined sort rules provide tie breaker rules to determine which employee is prioritized to be assigned an earlier live bidding time window.

FIG. 7 illustrates an example of a buddy request that may be inputted by an employee. An employee selects an employee to send a buddy request to by interacting with the employee selection box 76 and sends the buddy request by pressing the send request button 84. In a buddy request, a first employee may select box 82 to request authorization to bid for time slots in tandem with a second employee, so that the first employee and second employee will be assigned to the same time slot or assigned to consecutive time slots during the bidding process. The first employee may also select box 80 authorize the second employee to bid for time slots on the behalf of the first employee, and also select box 78 to authorize the second employee to view and input preferred criteria during the preference selection session on the behalf of the first employee. Thus, it will be appreciated that a user or employee participating in a bidding session may also be a pair of users or pair of employees participating in the bidding session.

FIG. 8 illustrates an example of employee preferences that may be input by the employee during the preference selection session that is scheduled before the vacation bidding session in a vacation scheduling program 208. The employee preferences may include a preferred week, multiple preferred weeks, and consecutive preferred weeks. These preference criteria may be input during the preference selection session, or may be input anytime at the convenience of the employee before or during the live vacation bidding session. In this example, the preference user interface 118 is displayed by the vacation scheduling program 208. A GUI control 120 and a GUI control 122 are displayed on the user interface 118. In this implementation, the GUI control 120 is manipulated by the employee to indicate one preferred week, multiple preferred weeks, or consecutive preferred weeks, while the GUI control 122 is manipulated by the employee to select one or more preferred weeks. In this example, the employee has indicated a preference of being assigned one of vacation week #3 and vacation week #5.

Figure 9:
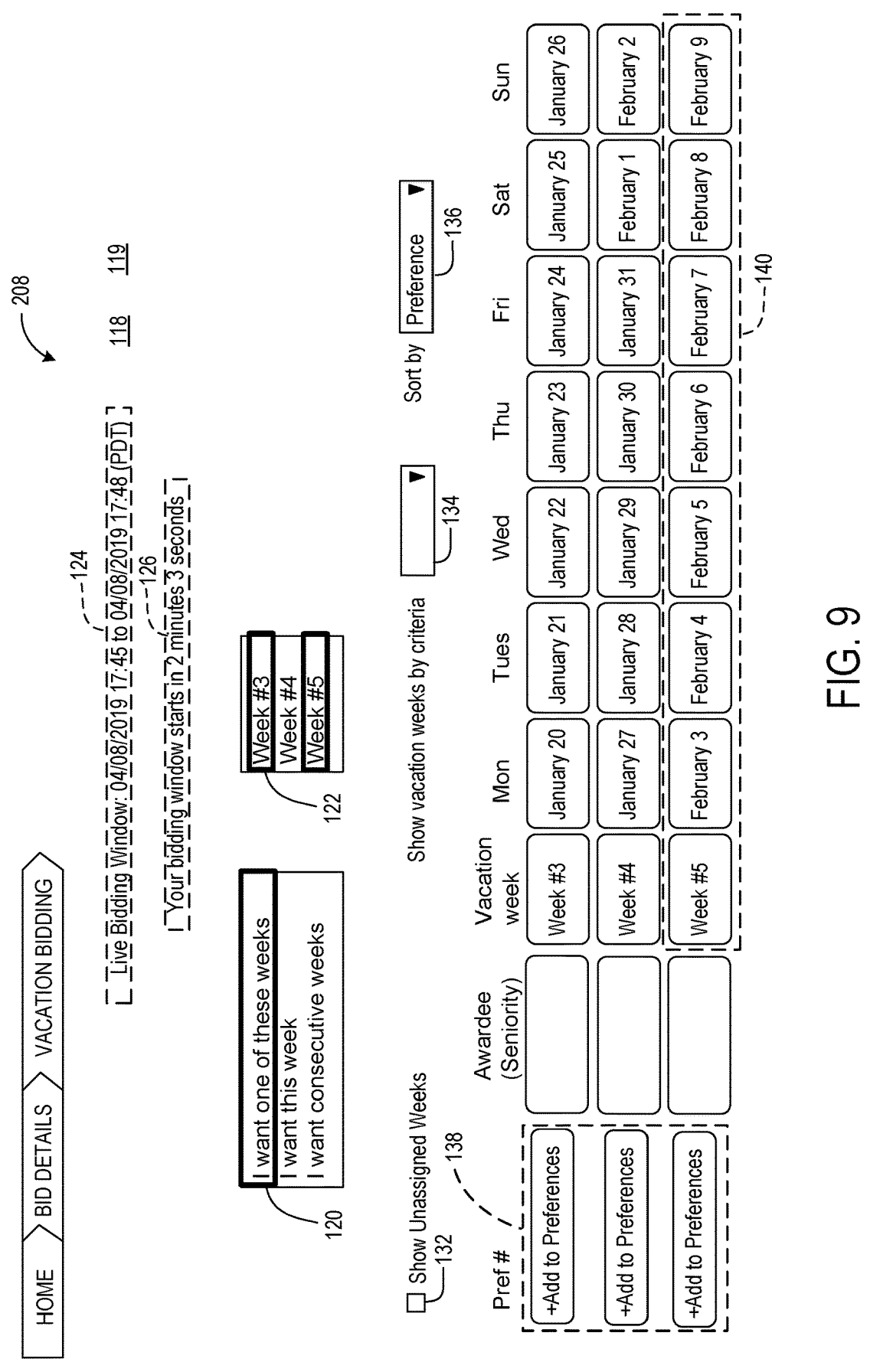

FIG. 9 illustrates an example user interface 118 of a preference time window 119 of a preference selection session of the vacation scheduling program 208. In the preference time window 119, the employees select specific vacation weeks that they prefer by pressing the 'add to preferences' button 138, and/or input their preferences for their vacation weeks by using the GUI controls 120 and 122. The start time and date and duration of the preference selection session are scheduled by an administrator or programmatically scheduled via an algorithm or predetermined rules.

In this example, the user interface 118 indicates a live bidding window duration 124 and the bidding window start time 126. The employee may check a box 132 to show unassigned vacation weeks, and select a criteria at the criteria box 134 to show vacation weeks by a selected criteria. Further, the employee may select a preference at the preference box 136 to sort the displayed vacation weeks by preferred criteria. The user may add a displayed vacation week 140 to the employee's preferences by selecting a preference button 138 corresponding to the preferred vacation week 140. In some embodiments, the user interface 118 may also display available vacation weeks during the year, holidays, and vacation weeks that have already been assigned.

An employee accepts an invitation to participate in a bidding session to fill one or more vacant vacation weeks, and the server starts the preference selection session at the scheduled time and date for the scheduled duration. The employee inputs one or more preference criteria for the vacation week(s) that the employee would prefer to be assigned to. When an employee does not set any preference criteria at all before the live bidding time window begins, and does not participate in the live bidding time window of a given bidding session, the server may execute predetermined sort rules to auto-assign a vacant vacation week to the employee, or the server may reschedule another bidding session or another preference selection session and bidding session for a later time. When an employee inputs preferences in the preference time window 119, but does not participate in the live bidding time window of a given bidding session, a processor may execute predetermined sort rules to auto-assign a vacant vacation week based on the employee's preferred criteria inputted during the preference selection session. The same preference selection session may be scheduled for all employees, multiple preference selection sessions may be scheduled for multiple employees, or each employee may be scheduled a unique preference selection session that does not overlap with the other preference selection sessions.

Figure 10:
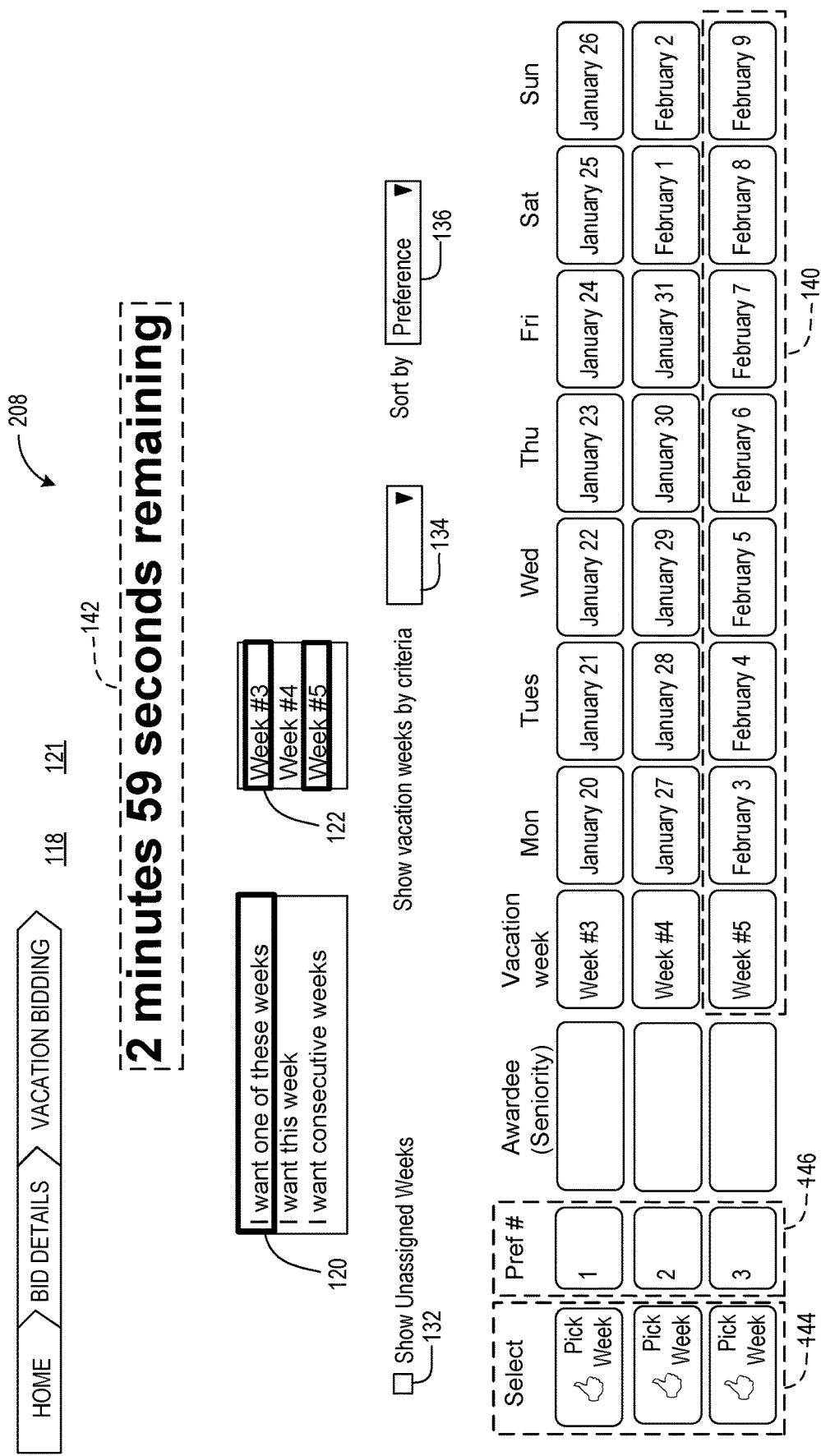
FIG. 10 shows an illustration of an example user interface that the user interacts with during the live bidding time window of the vacation scheduling program according to an embodiment of the present disclosure.

FIG. 10 illustrates an example user interface 118 of a live bidding time window 121 of the vacation scheduling program 208 for a vacation bidding session, which may be scheduled on an annual basis, for example. An employee participating in the shift bidding session logs into the live bidding time window 121, which is scheduled to take place after the preference time window. In other words, after the server terminates the preference time window, the server starts the live bidding time window 121 at the scheduled date and time for the scheduled duration. The live bidding time window 121 may be a controlled window that is active only for a predetermined time duration. Accordingly, the user interface 118 may include a live timer 142 showing the time left for bidding in real time. The employee may be notified or reminded of a scheduled bidding session by the vacation scheduling program 208. The preferences selected in the preference time window may be indicated in the preferences column 146 to aid the employee in selecting vacation weeks during the vacation bidding session.

During the live bidding time window 121, the user interface 118 may display live feeds of multiple available vacation weeks that closely match the preference criteria that the employee indicated during the preference selection session, prepopulating the user interface 118 with available vacation weeks based on the preferences of the employee. Accordingly, vacation weeks 140 on display may appear or disappear in real time as vacation weeks are assigned or released for reassignment. The user interface 118 may also display assigned vacation weeks of coworkers the employee participating in the bidding session. The employee may check a box 132 to filter the displayed vacation weeks to show only the unassigned vacation weeks, select a criteria at the criteria box 134 to show only vacation weeks that match the selected criteria. Further, the employee may select a preference at the preference box 136 to sort the displayed vacation weeks by a selected preference.

In the illustrated example of FIG. 10, the employee logs into the live bidding time window 121 during the scheduled vacation bidding session and bids for a desired vacation week 140 by selecting the button 144 corresponding to the desired vacation week 140. If the employee bids for a plurality of vacation weeks, multiple buttons 144 may be selected to select a plurality of vacation weeks. The employee may be assigned, by default, the vacation week that the employee selects in the live bidding time window 121, if no other employee selects the same vacation week (as occurs for example when the bid window is offered on a per-user basis, and is thus not offered to any other users). However, if the bid window is offered to multiple users and two or more employees select the same vacation week, the server may sort the two or more employees selecting the same vacation week by the predetermined sort rules or priority sort rules configured by the administrator (as described in FIG. 6), and one employee may be assigned to the vacation week, while the other employee who selected the same vacation week may be assigned a different, vacant vacation week that most closely matches the preference criteria indicated by the employee.

Figure 11:
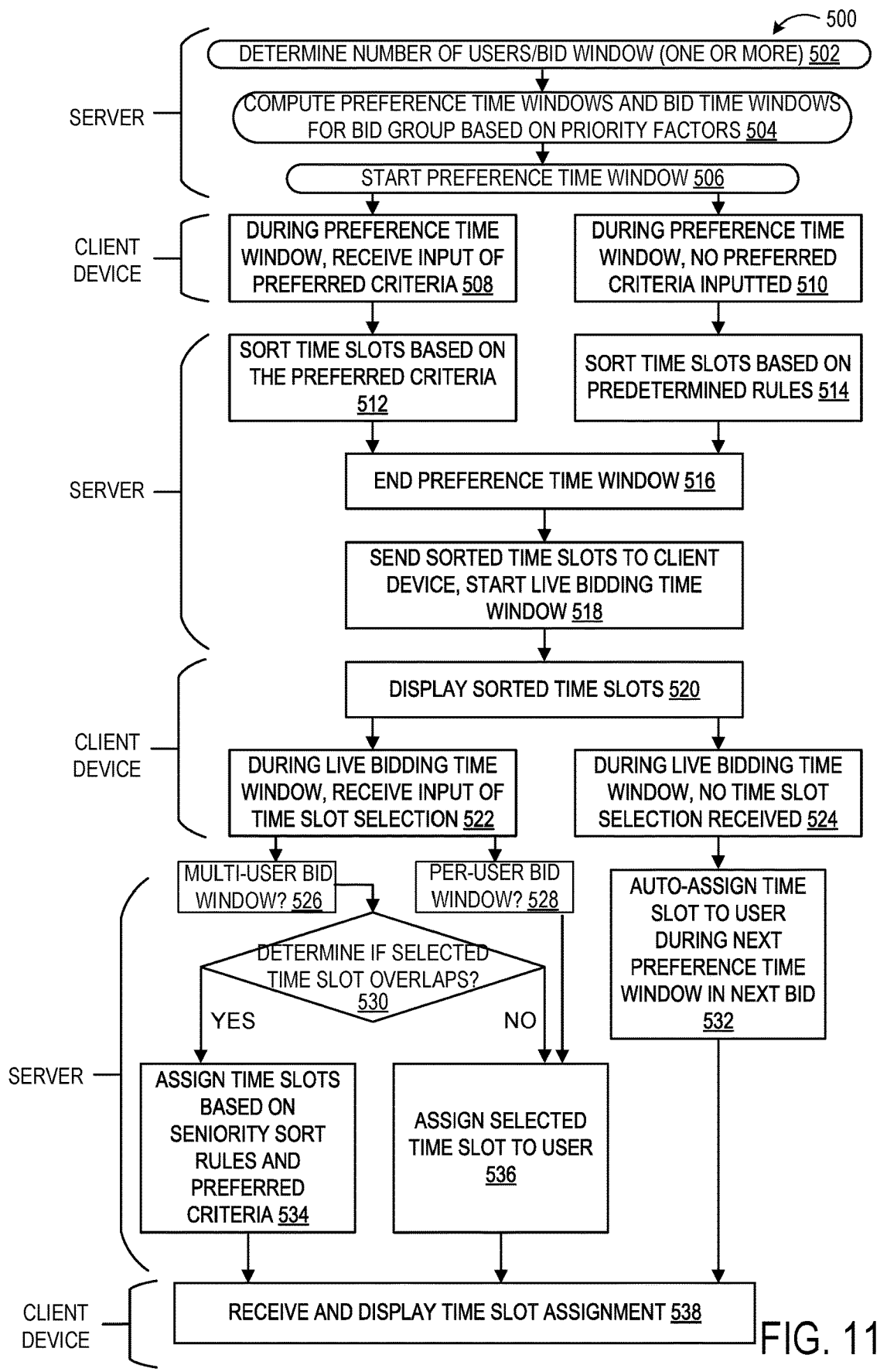
FIG. 11 shows an illustration of a first method that may be performed by a client device and a server in a time slot scheduling system according to an embodiment of the present disclosure.

FIG. 11 illustrates a flow chart of a first method 500 for assigning a plurality of users in a bid group to time slots among a plurality of time slots stored in a computer system. In this method, each of the plurality of users is assigned a unique live bidding time window based on predetermined priority rules. The following description of method 500 is provided with reference to the software and hardware components described above and shown in FIGS. 1 and 16. It will be appreciated that method 500 also may be performed in other contexts using other suitable hardware and software components. The time slots described in this method 500 may comprise a plurality of work shifts or a plurality of vacation periods.

At 502 the method 500 includes determining a number of users per bid window. The number may be one user, such that each user is assigned a per-user bid window. Or, alternatively, the number may be a predetermined number of multiple users, such that each user is presented with a multi-user bid window. It will be appreciated that the per-user bid window approach is less time efficient but has the advantage of avoiding conflicts in multiple users selecting the same time slot during the bid window time; whereas the latter approach consumes less time but suffers from the trade-off that when multiple users select the same time slot, predetermined priority rules are applied to ultimately assign each user a time slot.

At 504 the method 500 includes computing a schedule of one or more preference time windows and one or more bid time windows based on a set of priority factors. The schedule includes gaps a plurality of preference time windows for all users, and a plurality of bid time windows for all bid groups participating in the bidding session. Further, the bid time windows are separated by gaps, and these gaps may be used, as described herein, to give late bidders an opportunity to participate. The server may evaluate the preferences of the users during the gaps between the bid time windows. Example priority factors that may be used to determine the schedule are listed in FIG. 6 and discussed above.

At 506, the method 500 includes the server starting the preference time window at the scheduled time and date set by the administrator. At 508, for a given user among the plurality of users, the client device receives an invitation to participate in a preferences time window and a live bidding time window assigned to the given user, and receives a user input indicating preferences or preferred criteria of the given user for a time slot during the preferences time window. At 512, the server sorts the time slots included in the bidding session based on the preferred criteria inputted by the user. These preferred criteria may be evaluated during the gaps between the bid time windows. When preferences are received during a bid time window, these preferences may be evaluated in the gap following the bid time window during which the preferences were received. Accordingly, when an employee enters preferences after the live bidding time window assigned to the employee, these preferences may be evaluated during the next gap after the live bidding time window of the current bidding employee is finished. The algorithm for sorting the time slots included in the bidding session may be informed by a neural network trained on a data set of past preferences and selected time slots. Alternatively, at 510, the client device may not receive a user input of preferred criteria during the preference time window. In this case, at 514, the server sorts the time slots based on predetermined sort rules preprogrammed in the scheduling program.

After sorting the time slots, at 516, the server ends the preference time window once the time window lasts for the scheduled duration of time. At 518, the server sends a list of the sorted time slots to the client device, and starts the live bidding time window at the scheduled time and date set by the administrator. At 520, the client device receives from the server the list of sorted time slots sorted based on the preferences of the given user, and displays the sorted time slots. At 522, during the live bidding time window, the client device receives a given user input of a time slot selection among the time slots included in the list during a live bidding time window, and sends the time slot selection to the server during the live bidding time window. At 526, if the bid window is a multi-user bid window, then the method proceeds to step 530 where potential conflicts between selected time slots are resolved. At 528, if the bid window is a per-user bid window there is no potential for conflicting time slots and the method proceeds to step 536. At 530, the server determines whether the selected time slot has already been selected by another user. When it is determined by the server that the time slot has already been selected by another user, at 534, the server assigns the time slots based on predetermined sort rules and preferred criteria. Otherwise, when it is determined that no other user has selected the time slot, at 536, the selected time slot is assigned to the user who selected the time slot during the live bidding time window. At 538, the client device receives from the server an assignment of the given user to the selected time slot or an assignment of the given user to an alternative time slot.

Alternatively, at 524, when the client device does not receive a given user input indicating preferences of the given user during the live bidding time window, and the given user input of a time slot selection is not received during the live bidding time window, the method 500 moves to 532, when the server auto-assigns a time slot to the user during the next preference time window in the next bidding session. Alternatively, the given user may receive from the server an invitation to participate in a future preferences time window and a future live bidding time window. The future live bidding time window for the late bidding user may be inserted in a gap in the bid window time schedule, that is, between already scheduled bid windows of other users or groups of users. In another scenario, when a given user input indicating preferences of the given user is received, but the given user input of a time slot selection is not received during the live bidding time window, then the given user may receive from the server a time slot assignment based on the indicated preferences of the given user.

Figure 12:
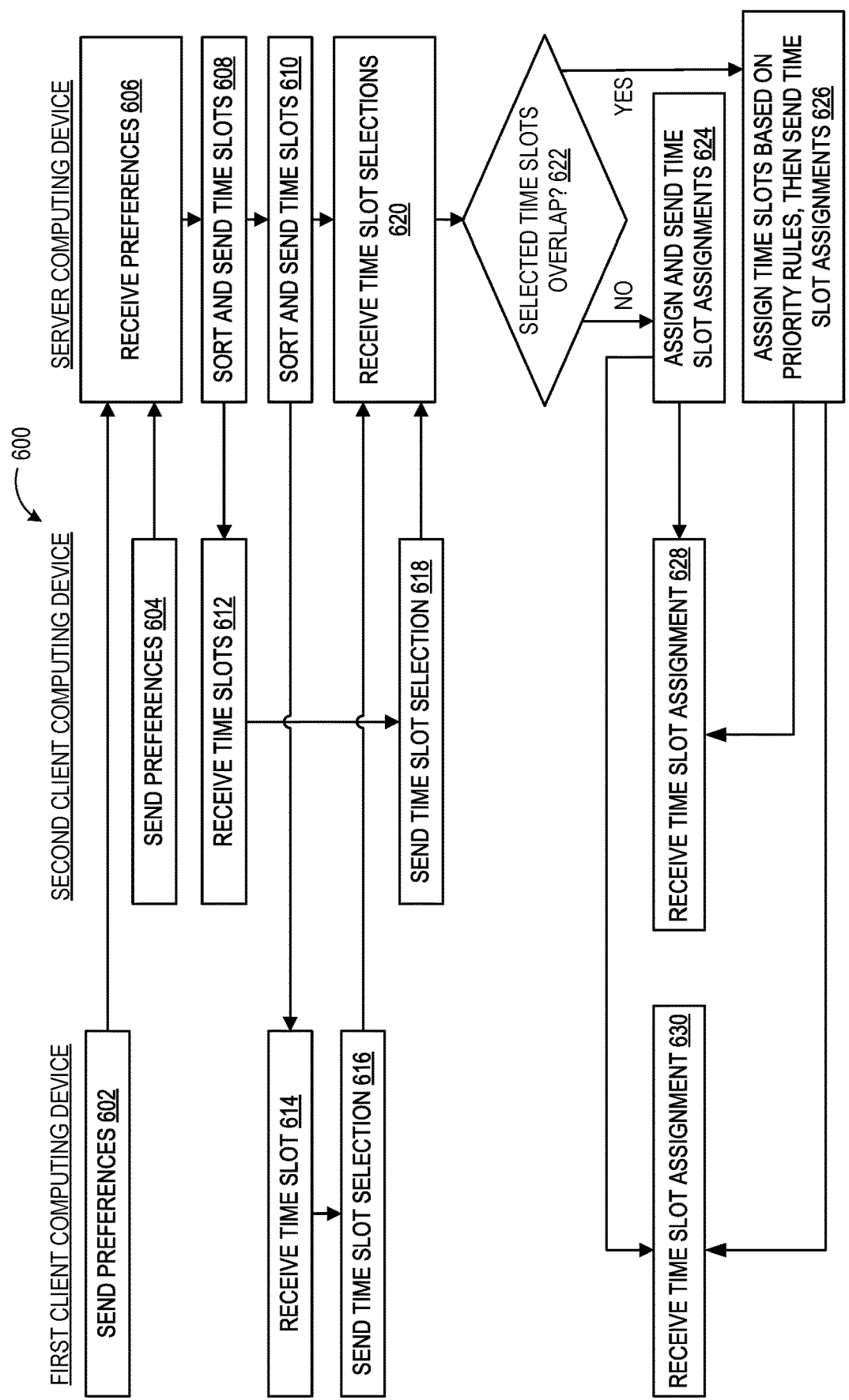
FIG. 12 shows an illustration of a second method that may be performed by a client device and a server in the time slot scheduling system according to an embodiment of the present disclosure.

FIG. 12 illustrates a flow chart of a first method 600. The following description of method 600 is provided with reference to the software and hardware components described above and shown in FIGS. 1 and 10. It will be appreciated that method 600 also may be performed in other contexts using other suitable hardware and software components. The method 600 may be used when multi-user bid windows employed in which multiple users can bid on the same time slots. In this case, resolution of potential conflicts between user selection of time slots may be performed as shown in method 600. Although time slots are described in this method 600, it will be appreciated that the method 600 may also be adapted to assign employees to a plurality of vacation periods instead of time slots.

At 602, the method 600 includes the first client computing device sending preferences to the server. At 604, the second client computing device sends preferences to the server.

At 606, the server computing device receives preferences of the first user from a first client device during a first preference time window, and receives preferences of the second user from a second client device during a second preference time window.

At 608, the server computing device sorts the plurality of time slots based on the preferences of the second user and compiling a second list of time slots, then sends the second list of time slots to the second client device.

At 610, the server computing device sorts the plurality of time slots based on the preferences of the first user and compiles a first list of time slots, then sends the first list of time slots to the first client device.

At 612, the second client computing device receives the second list of time slots from the server. At 618, the second client computing device receives a second user selection of a time slot from the second user during a live bidding time window. At 614, the first client computing device receives the first list of time slots from the server. At 616, the first client computing device receives a first user selection of a time slot from the first user during the live bidding time window. At 620, the server computing device receives the time slot selections from the first client computing device and the second client computing device.

At 622, the server determines whether the first user selection overlaps with the second user selection. When the server determines that the first user selection overlaps with the second user selection, at 626, the server assigns time slots to the first user and second user based on predetermined priority rules. On the other hand, when the first user selection does not overlap with the second user selection, at 624, the server assigns the time slot selected by the first user to the first user, and assigns the time slot selected by the second user to the second user. The time slot assignment of the first user is sent to the first client computing device, and the time slot assignment of the second user is sent to the second computing device. At 630, the first client computing device receives the time slot assignment of the first user, and at 628, the second client computing device receives the work assignment of the second user.

It will be appreciated that, when the first user selection is not received from the first user during the bidding session (live bidding time window), then the first user selection may be determined by the processor of the server based on the preferences of the first user received during the first preference selection session (preference time window). Likewise, when the second user selection is not received from the second user during the bidding session (live bidding time window), then the second user selection may be determined by the processor of the server based on the preferences of the second user received during the second preference selection session (second preference time window).

Further, it will be appreciated that, when preferences of the first user are not received from the first client device during the first preference selection session (first preference time window), then an invitation may be sent by the server to the first user to participate in a future preferences time window and a future bidding session, and when preferences of the second user are not received from the second client device during the second preference selection session (second preference time window), then an invitation may be sent by the server to the second user to participate in a future preferences time window and a future bidding session.

FIG. 13 is an illustration of a preference that may be input by a employee to replace one or more assigned vacation weeks or apply for one or more additional open vacation weeks during a change period of the vacation scheduling program. During a change period, employees who were assigned vacation weeks during the scheduled bidding process request assignment of one or more additional open vacation weeks or the replacement of their assigned weeks with different vacation weeks, indicating desired vacation week changes in order of preference. A processor then applies a vacation change method to scan the vacation change preferences of all participating employees, and reassign vacation weeks based on the vacation change method. At the user interface 118, the employee indicates a desire to replace one awarded or open one vacation week with another vacation week. The employee may manipulate the GUI control 120 to select an open vacation week to replace, and manipulate the GUI control 122 to select a desired vacation week to replace the open vacation week selected at the GUI control 120. The employee may indicate multiple desired replacements in order of preference. For example, the employee may indicate that the first preference of the employee is to replace open vacation week #1 with vacation week #1. However, the employee may also indicate a second preference of the employee to replace open week #4 with vacation week #1, for example. A preference may also indicate a request to accept another open vacation week without replacing an existing assigned vacation week of the employee. For example, the employee may indicate a third preference to accept vacation week #7, for example.

Figure 14:
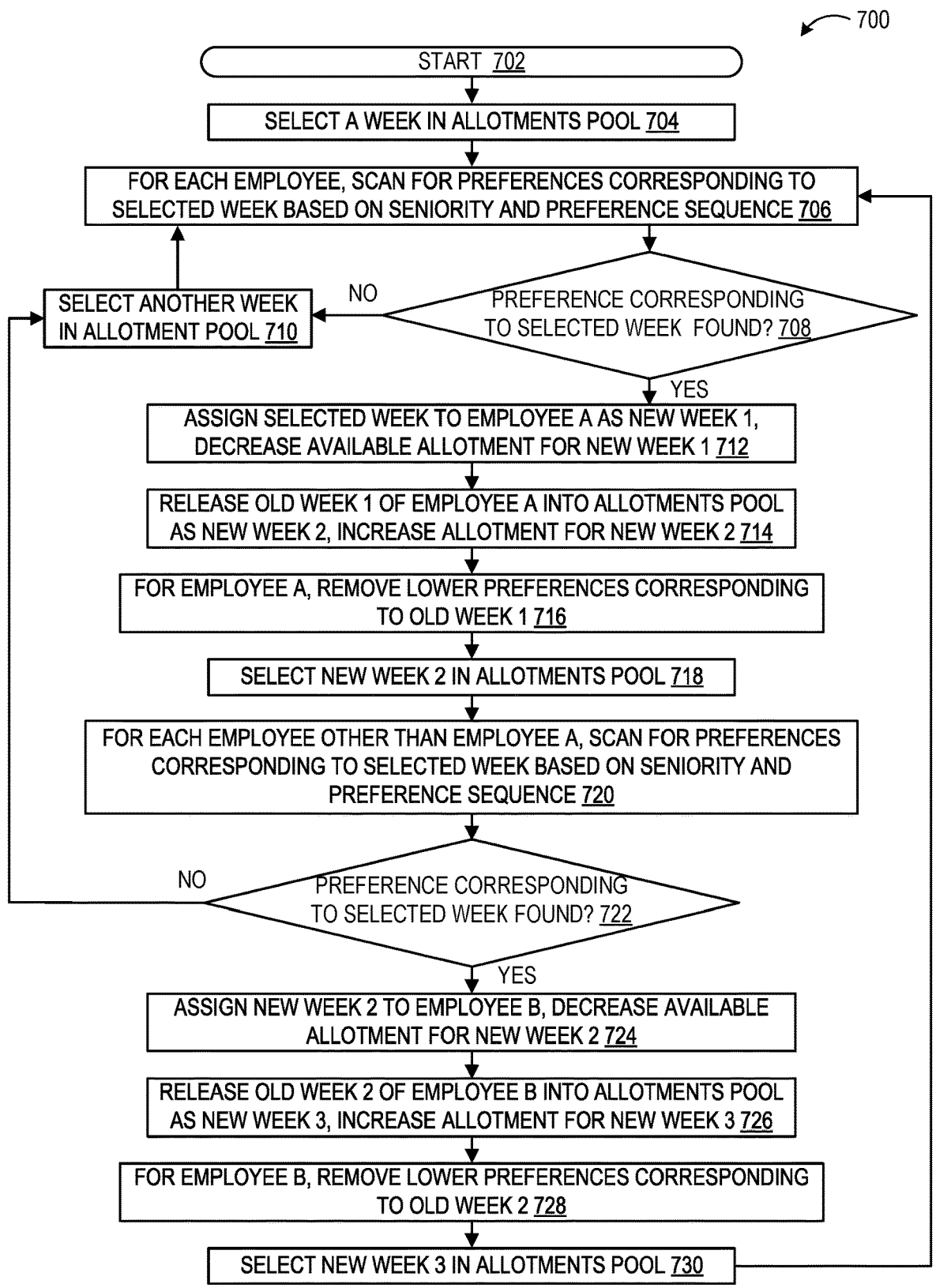
FIG. 14 shows an illustration of a third method that may be performed by a server in a vacation scheduling system for changing vacation weeks according to an embodiment of the present disclosure.

FIG. 14 illustrates a vacation change method 700 according to an embodiment of the present disclosure. In this method 700, each vacation week is assigned an allotment number, or a predetermined maximum number of employees assigned to a given vacation week. For example, when a company expects to handle a higher workload during weeks #3 and #4, the company may decrease the allotment numbers for vacation weeks #3 and #4 to ensure that fewer employees take vacation days off during vacation weeks #3 and #4. It will be appreciated that a vacation week may be defined as a vacation period with a predetermined duration that may be shorter or longer than a calendar week. For example, the vacation period may be a block of time that may span several consecutive calendar weeks, a set of vacation days that are spaced apart from each other, or a set of vacation days that are cyclically scheduled (every few weeks or every month, for example).

At step 702, the method 700 starts. At step 704, a vacation week is selected in an allotments pool, which contains open vacation weeks that have not yet been assigned to an employee. At step 706, for each employee, the preferences corresponding to the selected week are scanned based on seniority and preference sequence. At step 708, it is determined whether a preference corresponding to the selected week was found. If a preference corresponding to the selected week was not found, the method 700 moves on to step 710, another week is selected in the allotment pool, and the method 700 returns to step 706. If a preference corresponding to the selected week was found, the method 700 moves on to step 712. The preference may request the replacement of old week 1 with new week 1, which corresponds to the selected week. When the preferences of more than one employee correspond to the selected week, then predetermined sorting rules may be applied to assign the selected week to one of the employees based on tie breaker rules described in FIG. 6.

At step 712, the selected week is assigned to the employee with the preference corresponding to the selected week (hereinafter described as 'employee A') as new week 1. The available allotment for new week 1 is subsequently decreased. At step 714, old week 1 of employee A is released into the allotments pool as new week 2, and the available allotment for old week 1 is subsequently decreased. At step 716, the lower preferences in the preference sequence of employee A corresponding to old week 1 are removed. For example if employee A had a first preference to replace old week 1 with new week 1, but also a second preference to replace old week 1 with new week 3, the second preference would be removed from the preference sequence of employee A at step 716.

At step 718, new week 2 is selected in the allotments pool. At step 720, for each employee other than employee A, the preferences corresponding to the selected week are scanned based on seniority and preference sequence. At step 722, it is determined whether a preference corresponding to the selected week was found. If a preference corresponding to the selected week was not found, the method 700 moves on to step 710, another week is selected in the allotment pool, and the method 700 returns to step 706. If a preference corresponding to the selected week was found, the method 700 moves on to step 724. The preference may request the replacement of old week 2 with new week 2, which corresponds to the selected week. When the preferences of more than one employee correspond to the selected week, then predetermined sorting rules may be applied to assign the selected week to one of the employees based on tie breaker rules described in FIG. 6.

At step 724, the selected week is assigned to the employee with the preference corresponding to the selected week (hereinafter described as 'employee B') as new week 2. The available allotment for new week 2 is subsequently decreased. At step 726, old week 2 of employee B is released into the allotments pool as new week 3, and the available allotment for old week 2 is subsequently decreased. At step 728, the lower preferences in the preference sequence of employee B corresponding to old week 2 are removed. For example if employee B had a first preference to replace old week 2 with new week 2, but also a second preference to replace old week 2 with new week 4, the second preference would be removed from the preference sequence of employee B at step 728. At step 730, new week 3 is selected in the allotments pool 730, and the method 700 returns to step 706.

Figure 15:
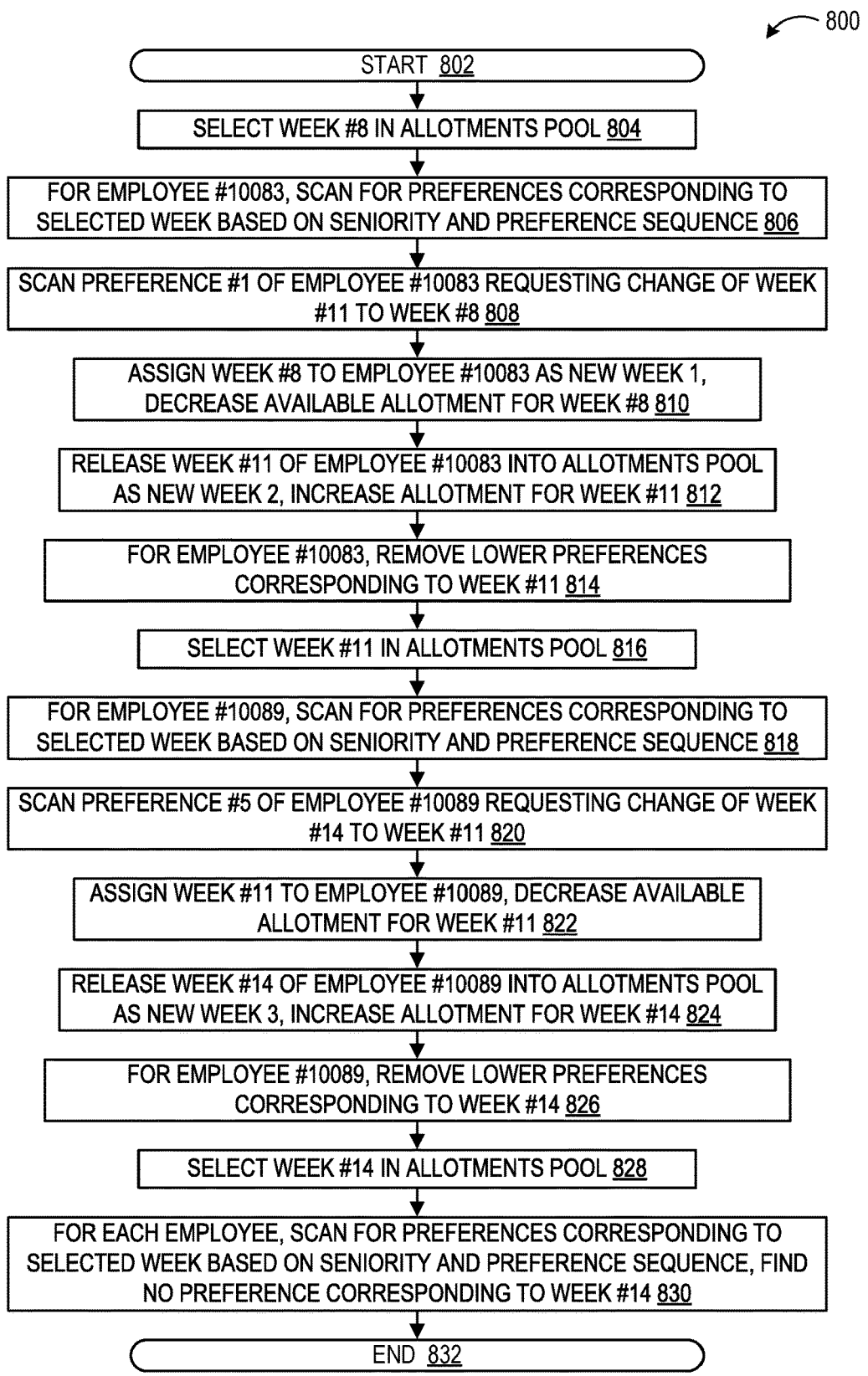
FIG. 15 shows an example implementation of the third method that may be performed by a server in a vacation scheduling system for changing vacation weeks according to an embodiment of the present disclosure.

FIG. 15 shows a vacation change method 800 illustrating an example application of the vacation change method 700 for reassigning the vacation weeks of employees #10083 and #10089 according to an embodiment of the present disclosure. In this example, employee #10083 has been assigned vacation week #11 during the scheduled bidding process, and has indicated a first preference to replace vacation week #11 with vacation week #8. Employee #10089 has been assigned vacation week #14 during the scheduled bidding process, and has indicated a first preference to replace vacation week #14 with vacation week #11.

At step 802, the method 800 starts. At step 804, week #8 is selected in the allotments pool. At step 806, the preferences of employee #10083 are scanned to search for preferences corresponding to the selected week based on seniority and preference sequence. At step 808, a first preference of employee #10083 is scanned requesting to replace vacation week #11 with vacation week #8. At step 810, since the first preference is determined to correspond to the selected vacation week #8, vacation week #8 is assigned to employee #10083 as new week 1, and the available allotment for vacation week #8 is subsequently decreased. At step 812, vacation week #11 of employee #10083 is released into the allotments pool as new week 2, and the available allotment for vacation week #11 is subsequently increased. At step 814, the lower preferences of employee #10083 corresponding to week #11 are removed.

At step 816, week #11 is selected in the allotments pool. At step 818, the preferences of employee #10089 are scanned to search for preferences corresponding to the selected week based on seniority and preference sequence.

At step 820, a fifth preference of employee #10089 is scanned requesting to replace vacation week #14 with vacation week #11. At step 822, since the fifth preference is determined to correspond to the selected vacation week #11, vacation week #11 is assigned to employee #10089 as new week 2, and the available allotment for vacation week #11 is subsequently decreased. At step 824, vacation week #14 of employee #10089 is released into the allotments pool as new week 3, and the available allotment for vacation week #14 is subsequently increased. At step 826, the lower preferences of employee #10089 corresponding to week #11 are removed.

At step 828, week #14 is selected in the allotments pool. In this example, no preference corresponding to week #14 is found after scanning the preferences of the each employee for a preference corresponding to the selected week based on seniority and preference sequence. Therefore, the method 800 ends at step 832.

In some embodiments, the methods and processes described herein may be tied to a computing system of one or more computing devices. In particular, such methods and processes may be implemented as a computer-application program or service, an application-programming interface (API), a library, and/or other computer-program product.

Figure 16:
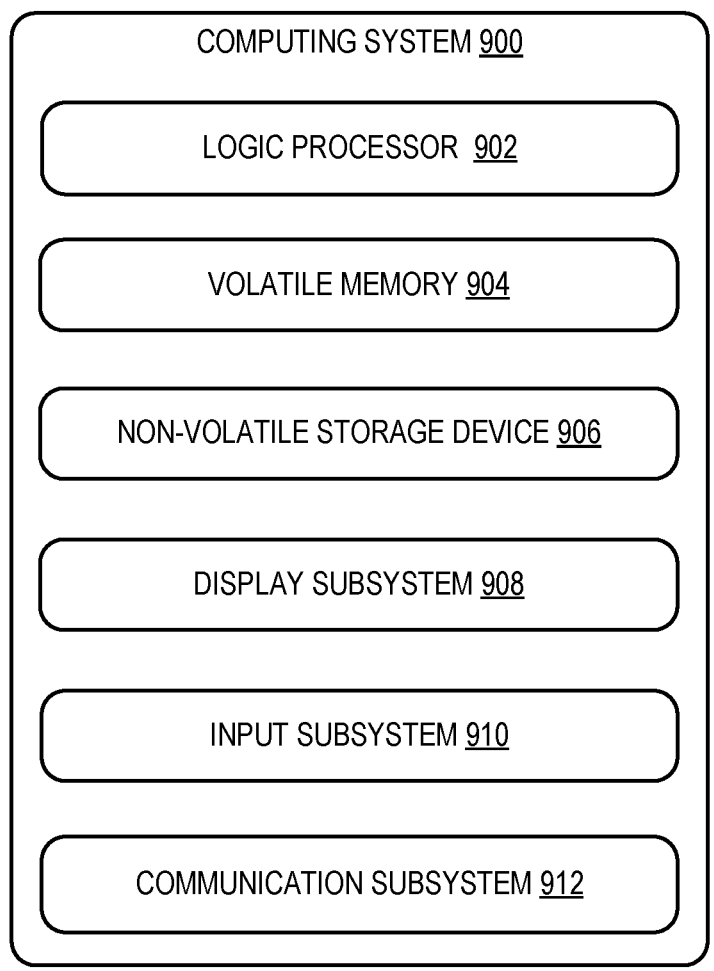
FIG. 16 shows a computing system according to an embodiment of the present disclosure.

FIG. 16 schematically shows a non-limiting embodiment of a computing system 900 that can enact one or more of the methods and processes described above. Computing system 900 is shown in simplified form. Computing system 900 may embody the computing device 12 or computing device 14 of FIG. 1 or the server computing device 200 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 16.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally, or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as Bluetooth and HDMI over Wi-Fi connection. In some embodiments, the communication subsystem may allow computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A time slot scheduling system for assigning time slots, the system comprising:
a processor;
a time slot database storing a plurality of time slots; and
a memory storing instructions that, when executed by the processor, cause the system to:
cause a first display of a first client device to start a first preference selection session and display a first preference user interface to receive preferences of a first user:
receive the preferences of the first user from the first client device on the first preference user interface during the first preference selection session;
sort the plurality of time slots based on the preferences of the first user and compiling a first list of time slots;
send the first list of time slots to the first client device;
cause a second display of a second client device to start a second preference selection session and display a second preference user interface to receive preferences of a second user;
receive the preferences of the second user from the second client device on the second preference user interface during the second preference selection session;
sort the plurality of time slots based on the preferences of the second user and compile a second list of time slots;
sending the second list of time slots to the second client device;
cause the first display of the first client device to start a first bidding session and display a first live bidding user interface and the first list of time slots to receive a first user selection;
receive the first user selection of a time slot from the first user among the first list of time slots during the first bidding session;
cause the second display of the second client device to start a second bidding session and display a second live bidding user interface and the second list of time slots to receive a second user selection;
receive the second user selection of a time slot from the second user among the second list of time slots during the second bidding session;
when the first user selection overlaps with the second user selection, assign time slots to the first user and second user based on predetermined priority rules; and
when the first user selection does not overlap with the second user selection, assign the time slot selected by the first user to the first user, and assign the time slot selected by the second user to the second user.

2. The system of claim 1, wherein the predetermined priority rules include assigning the time slots to one of the first user and the second user based on at least one of hire date, job title, pay grade, seniority rank, union seniority, and work performance.

3. The system of claim 1, wherein the first user and second user are each assigned a unique bidding session based on predetermined priority rules.

4. The system of claim 1, wherein when the first user selection is not received from the first user during the first bidding session, then the first user selection is determined by the processor based on the preferences of the first user received during the first preference selection session, and when the second user selection is not received from the second user during the second bidding session, then the second user selection is determined by the processor based on the preferences of the second user received during the second preference selection session.

5. The system of claim 1, wherein when preferences of the first user are not received from the first client device during the first preference selection session, then an invitation is sent to the first user to participate in a future preferences time window and a future bidding session, and when preferences of the second user are not received from the second client device during the second preference selection session, then an invitation is sent to the second user to participate in a future preferences time window and a future bidding session.

6. The system of claim 1, wherein the time slots are work shifts, and the time slot database is a work shift database.

7. The system of claim 6, wherein the preferences of the first user and the second user include at least one of work shift start time, work shift end time, location, skills, and off days.

8. The system of claim 1, wherein the time slots are vacation periods, and the time slot database is a vacation database.

9. The system of claim 8, wherein the preferences of the first user and the second user include at least one of a preferred vacation, one of a plurality of vacation periods, and a plurality of consecutive vacation periods.

10. A method for assigning to a first user and a second user time slots among a plurality of time slots stored in a database, the method comprising:
- causing a first display of a first client device to start a first preference selection session and display a first preference user interface to receive preferences of the first user;
- receiving the preferences of the first user from the first client device on the first preference user interface during the first preference selection session;
- sorting the plurality of time slots based on the preferences of the first user and compiling a first list of time slots;
- sending the first list of time slots to the first client device;
- causing a second display of a second client device to start a second preference selection session and display a second preference user interface to receive preferences of the second user;
- receiving the preferences of the second user from the second client device on the second preference user interface during the second preference selection session;
- sorting the plurality of time slots based on the preferences of the second user and compiling a second list of time slots;
- sending the second list of time slots to the second client device;
- causing the first display of the first client device to start a first bidding session and display a first live bidding user interface and the first list of time slots to receive a first user selection;
- receiving the first user selection of a time slot from the first user among the first list of time slots during the first bidding session;
- causing the second display of the second client device to start a second bidding session and display a second live bidding user interface and the second list of time slots to receive a second user selection;
- receiving the second user selection of a time slot from the second user among the second list of time slots during the second bidding session;
- when the first user selection overlaps with the second user selection, assigning time slots to the first user and second user based on predetermined priority rules; and
- when the first user selection does not overlap with the second user selection, assigning the time slot selected by the first user to the first user, and assigning the time slot selected by the second user to the second user.

11. The method of claim 10, wherein the predetermined priority rules include assigning the time slots to one of the first user and the second user based on at least one of hire date, job title, pay grade, seniority rank, union seniority, and work performance.

12. The method of claim 10, wherein the first user and second user are each assigned a unique bidding session based on predetermined priority rules.

13. The method of claim 10, wherein when the first user selection is not received from the first user during the first bidding session, then the first user selection is determined based on the preferences of the first user received during the first preference selection session, and when the second user selection is not received from the second user during the second bidding session, then the second user selection is determined based on the preferences of the second user received during the second preference selection session.

14. The method of claim 10, wherein the time slots are work shifts, and the database is a work shift database.

15. The method of claim 14, wherein the preferences of the first user and the second user include at least one of work shift start time, work shift end time, location, skills, and off days.

16. The method of claim 10, wherein the time slots are vacation periods, and the database is a vacation database.

17. The method of claim 16, wherein the preferences of the first user and the second user include at least one of a preferred vacation, one of a plurality of vacation periods, and a plurality of consecutive vacation periods.

* * * * *